(12) United States Patent
Itoh et al.

(10) Patent No.: US 11,577,663 B2
(45) Date of Patent: Feb. 14, 2023

(54) ELECTRIC VEHICLE

(71) Applicants: TOYOTA JIDOSHA KABUSHIKI KAISHA, Aichi (JP); SUBARU CORPORATION, Tokyo (JP)

(72) Inventors: Keisuke Itoh, Nagoya (JP); Ryotaro Fujikawa, Tokyo-to (JP); Iwao Furukawa, Tokyo-to (JP); Tomohiro Matsumoto, Tokyo-to (JP)

(73) Assignees: TOYOTA JIDOSHA KABUSHIKI KAISHA, Aichi-ken (JP); SUBARU CORPORATION, Tokyo (JP)

( * ) Notice: Subject to any disclaimer, the term of this patent is extended or adjusted under 35 U.S.C. 154(b) by 23 days.

(21) Appl. No.: 17/197,037

(22) Filed: Mar. 10, 2021

(65) Prior Publication Data

US 2021/0300260 A1    Sep. 30, 2021

(30) Foreign Application Priority Data

Mar. 25, 2020  (JP) .............................. JP2020-054822

(51) Int. Cl.
*B60R 11/02*   (2006.01)
*B60R 16/023*  (2006.01)
*B60R 11/00*   (2006.01)

(52) U.S. Cl.
CPC ...... *B60R 11/0264* (2013.01); *B60R 16/0239* (2013.01); *B60R 2011/0036* (2013.01)

(58) Field of Classification Search
CPC ............. B60R 11/0264; B60R 16/0239; B60R 2011/0036; B60R 2011/0052; B60L 3/0007; B62D 25/08
See application file for complete search history.

(56) References Cited

U.S. PATENT DOCUMENTS

| | | | |
|---|---|---|---|
| 2016/0137098 A1 | 5/2016 | Katano et al. | |
| 2017/0166150 A1* | 6/2017 | Meyers | ............... B60R 16/0239 |
| 2018/0102002 A1* | 4/2018 | Ohta | ........................ B60L 15/20 |
| 2018/0301983 A1* | 10/2018 | Okazaki | .................. H02M 1/44 |
| 2019/0275876 A1 | 9/2019 | Fukui et al. | |

FOREIGN PATENT DOCUMENTS

| | | |
|---|---|---|
| CN | 105599698 A | 5/2016 |
| JP | 2019156028 A | 9/2019 |
| JP | 202019296 A | 2/2020 |

* cited by examiner

*Primary Examiner* — Jacob M Amick
*Assistant Examiner* — Charles J Brauch
(74) *Attorney, Agent, or Firm* — Hauptman Ham, LLP

(57) ABSTRACT

An electric vehicle may include a body, a bracket fixed in a rear potion of the body, a low-voltage component supported by the bracket and a high-voltage component located frontward of the low-voltage component. The bracket may include a front end fixed to the body at a position frontward of the low-voltage component, a rear end fixed to the body at a position rearward of the low-voltage component and at least one bend located between the front end and the rear end and each having an upwardly protruding shape. The at least one bend may include one or both of a first bend located frontward of the low-voltage component and a second bend located rearward of the low-voltage component.

13 Claims, 4 Drawing Sheets

ELECTRIC VEHICLE

CROSS-REFERENCE TO RELATED APPLICATION(S)

This application claims priority to Japanese patent application No. 2020-054822, filed on Mar. 25, 2020, the entire contents of which are incorporated herein by reference.

TECHNICAL FIELD

The art disclosed herein relates to an electric vehicle.

BACKGROUND

Electric vehicles are known. In an electric vehicle, a plurality of electrical components is arranged at various positions in a body. For example, Japanese Patent Application Publication No. 2019-156028 describes an example of such an electric vehicle. The electric vehicle described herein broadly refers to vehicles configured to drive their wheels with traction motors. The electric vehicle includes, for example, an electric vehicle configured to be charged by external electric power, a hybrid vehicle having a traction motor and an engine, and a fuel cell vehicle which uses a fuel cell as its power source.

SUMMARY

A plurality of electrical components of an electric vehicle can be classified as either a high-voltage component or a low-voltage component which does not qualify as the high-voltage component. The high-voltage component herein refers to an electrical component which operates by an AC voltage exceeding 30 volts or a DC voltage exceeding 60 volts. Such a high-voltage component includes for example a traction motor or a power control unit (PCU) configured to control electric power supplied to the traction motor. On the other hand, the low-voltage component includes for example an electronic control unit (ECU) including a processor.

Some of the electrical components may be arranged in a rear portion of a body. In this case, the high-voltage component is preferably located distant from a rearmost portion of the vehicle so that it will not be damaged by a rear-end collision. On the other hand, the low-voltage component may be arranged rearward of the high-voltage component. However, when the low-voltage component is arranged rearward of the high-voltage component, the low-voltage component may be thrusted forward in the rear-end collision, and the high-voltage component may thereby be damaged. The disclosure herein provides art that can prevent a low-voltage component from moving toward a high-voltage component in a rear-end collision.

An aspect of the art discloses an electric vehicle. This electric vehicle may comprise: a body; a bracket fixed in a rear potion of the body; a low-voltage component supported by the bracket; and a high-voltage component located frontward of the low-voltage component. The bracket may comprise: a front end fixed to the body at a position frontward of the low-voltage component; a rear end fixed to the body at a position rearward of the low-voltage component; and at least one bend located between the front end and the rear end and having an upwardly protruding shape. The at least one bend may comprise one or both of a first bend located frontward of the low-voltage component and a second bend located rearward of the low-voltage component.

In the aforementioned electric vehicle, the at least one bend is provided in the bracket supporting the low-voltage component. As such, when the electric vehicle collides from its rear end, the bracket having received a collision load is prone to collapsing at the bend. Especially when the bend has the upwardly protruding shape, the bracket is prone to collapsing such that it protrudes upward, as a result of which the bracket is displaced upward together with the low-voltage component. This can prevent the low-voltage component from moving forward, that is, moving toward the high-voltage component.

DETAILED DESCRIPTION

Figure 1:
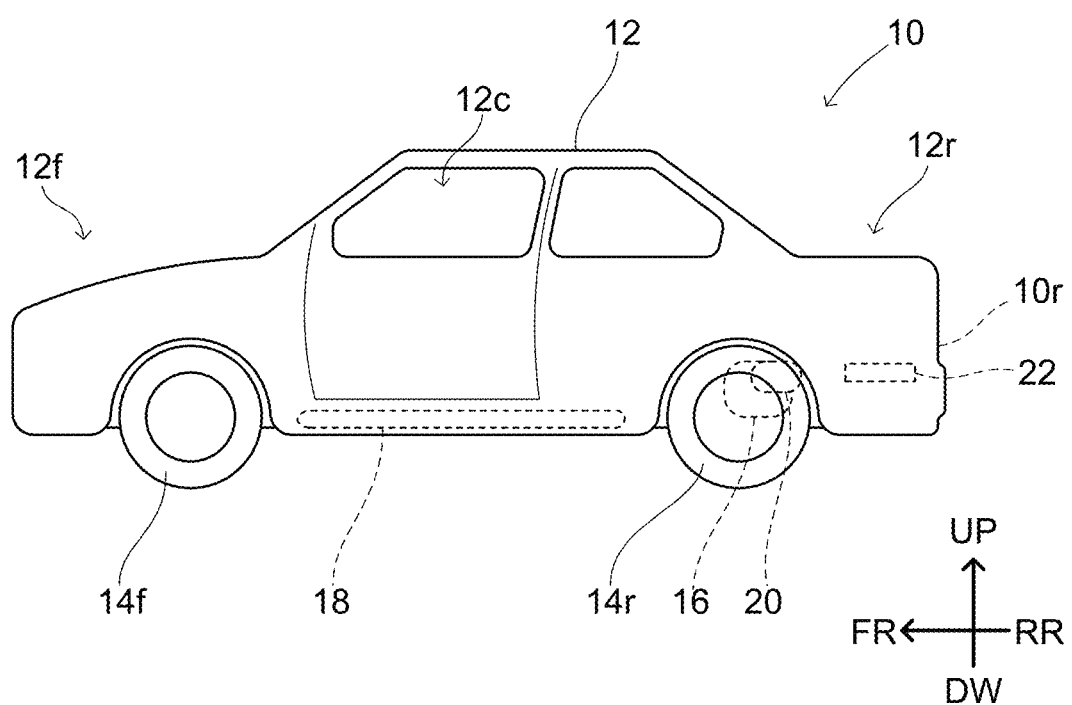
FIG. 1 is a side view schematically showing an entirety of an electric vehicle 10.

In an embodiment of the art disclosed herein, at least one bend may comprise both of a first bend located frontward of a low-voltage component and a second bend located rearward of the low-voltage component. According to such a configuration, a bracket having received a collision load bends at the first and second bends, thus the bracket is prone to being displaced upward together with the low-voltage component.

In an embodiment of the art disclosed herein, the bracket may comprise a plate-shaped member extending between a front end and a rear end in a longitudinal direction. In this case, each of the first bend and the second bend may extend across a full width of the bracket perpendicular to the longitudinal direction of the bracket. According to such a configuration, the bracket having received the collision load is prone to collapsing at the first bend and/or the second bend.

In an embodiment of the art disclosed herein, the low-voltage component may be located below the bracket. According to such a configuration, the low-voltage component suspended on the bracket can more easily stabilize itself by its own weight. However, as another embodiment, the low-voltage component may be located above the bracket.

In an embodiment of the art disclosed herein, one or both of the first bend and the second bend may have an upwardly protruding bead shape. In this case, the bracket may extend along a straight line linking the front end and the rear end except in one or more of areas where the at least one bend is located, although not particularly limited thereto. That is, the bracket may be a member which extends straight as a whole and is bent locally only at the first and/or second bends.

In an embodiment of the art disclosed herein, one or both of the first bend and the second bend may have an upwardly protruding mountain fold shape. In this case, each of the first bend and the second bend may be located above the straight line linking the front end and the rear end of the bracket, although not particularly limited thereto. According to such a configuration, the bracket having received the collision load is prone to collapsing by protruding upward.

In an embodiment of the art disclosed herein, low-voltage component may be an electronic control unit comprising at least one processor. However, as another embodiment, the low-voltage component may for example be another type of electrical component such as an auxiliary battery configured to supply electric power to the electronic control unit.

In an embodiment of the art disclosed herein, the high-voltage component may comprise at least one of a traction motor configured to drive a wheel and a power control unit configured to control electric power supplied to the motor. However, as another embodiment, the high-voltage component may for example comprise another type of electrical component such as a battery configured to supply electric power to the traction motor.

Hereinbelow, representative, non-limiting examples of the present disclosure will now be described in further detail with reference to the attached drawings. This detailed description is merely intended to teach a person of skill in the art further details for practicing preferred aspects of the art disclosed herein and is not intended to limit the scope of the disclosure. Furthermore, each of the additional features and teachings disclosed below may be utilized separately or in conjunction with other features and teachings to provide improved electric vehicles, as well as methods for using and manufacturing the same.

Moreover, combinations of features and steps disclosed in the following detailed description may not be necessary to practice the disclosure in the broadest sense, and are instead taught merely to particularly describe representative examples of the disclosure. Furthermore, various features of the above-described and below-described representative examples, as well as the various independent and dependent claims, may be combined in ways that are not specifically and explicitly enumerated in order to provide additional useful embodiments of the present teachings.

All features disclosed in the description and/or the claims are intended to be disclosed separately and independently from each other for the purpose of original written disclosure, as well as for the purpose of restricting the claimed subject matter, independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

Terms such as a frontward direction, a rearward direction, and a front-rear direction herein refer to a frontward direction, a rearward direction, and a front-rear direction with respect to an electric vehicle, respectively. Similarly, terms such as a leftward direction, a rightward direction, and a right-left direction refer to a leftward direction, a rightward direction, and a right-left direction with respect to the electric vehicle, respectively, and terms such as an upward direction, a downward direction, and an up-down direction refer to an upward direction, a downward direction, and an up-down direction with respect to the electric vehicle, respectively. For example, when the electric vehicle is placed on a horizontal plane, the up-down direction of the electric vehicle matches a vertical direction. Further, the right-left direction of the electric vehicle is a direction parallel to an axle of the electric vehicle, and the front-rear direction of the electric vehicle is a direction parallel to the horizontal plane and perpendicular to the axle of the electric vehicle.

An electric vehicle 10 of an embodiment will be described with reference to the drawings. As shown in FIG. 1, the electric vehicle 10 includes a body 12 and a plurality of wheels 14f, 14r. The body 12 is constituted of, but not particularly limited to, metal. The body 12 primarily includes a front portion 12f, a cabin 12c, and a rear portion 12r. The front portion 12f of the body 12 is located frontward of the cabin 12c, and is also called a front body. The rear portion 12r of the body 12 is located rearward of the cabin 12c, and is also called a rear body. The plurality of wheels 14f, 14r includes a pair of front wheels 14f and a pair of rear wheels 14r. The number of the wheels 14f, 14r is not limited to four.

Here, a direction FR in the drawings indicates the frontward direction in the front-rear direction of the electric vehicle 10, and a direction RR indicates the rearward direction in the front-rear direction of the electric vehicle 10. A direction LA indicates the leftward direction in the right-left direction (or a width direction) of the electric vehicle 10, and a direction RH indicates the rightward direction in the right-left direction of the electric vehicle 10. A direction UP indicates the upward direction in the up-down direction of the electric vehicle 10, and a direction DW indicates the downward direction in the up-down direction of the electric vehicle 10. In embodiments below, the frontward direction, the rearward direction, and the front-rear direction of the electric vehicle 10, the leftward direction, the rightward direction, and the right-left direction of the electric vehicle 10, and the upward direction, the downward direction, and the up-down direction of the electric vehicle 10 may respectively be termed simply as the frontward, rearward, the front-rear direction, leftward, rightward, the right-left direction, upward, downward, and up-down direction.

Figure 2:
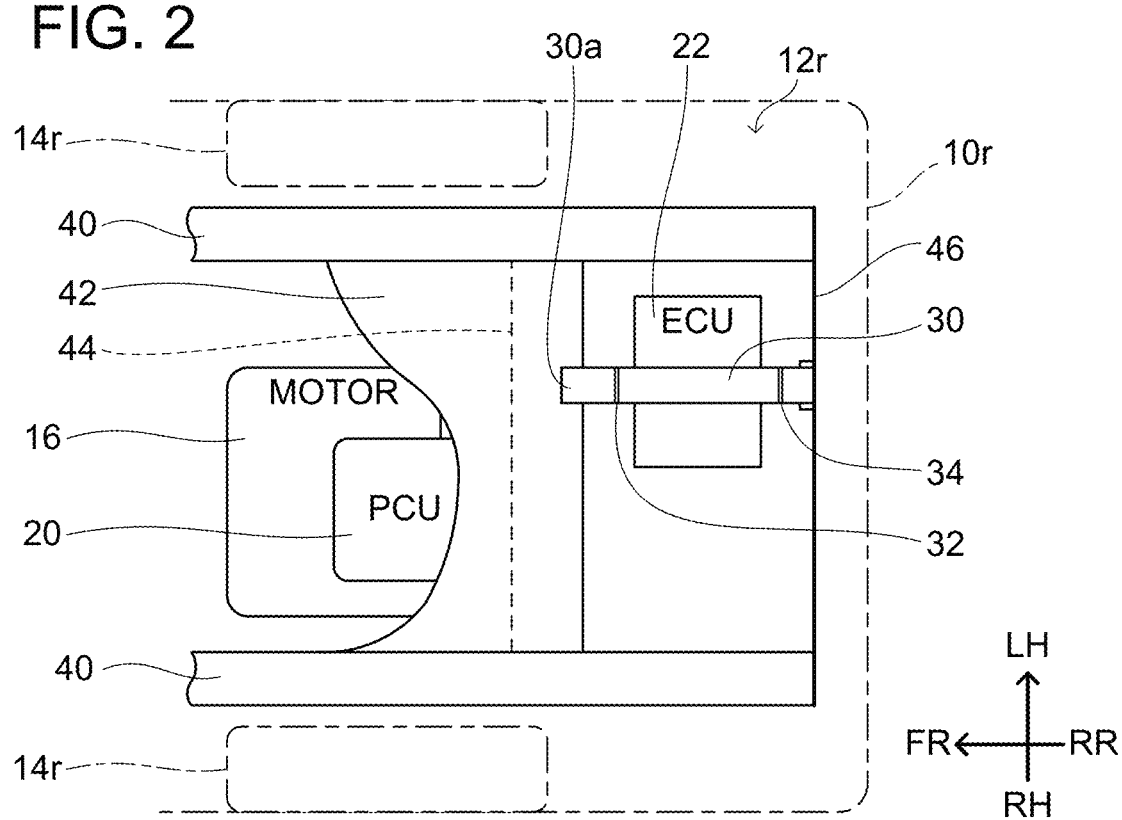
FIG. 2 is a plan view schematically showing a configuration of a rear portion 12r of a body 12.
Figure 3:
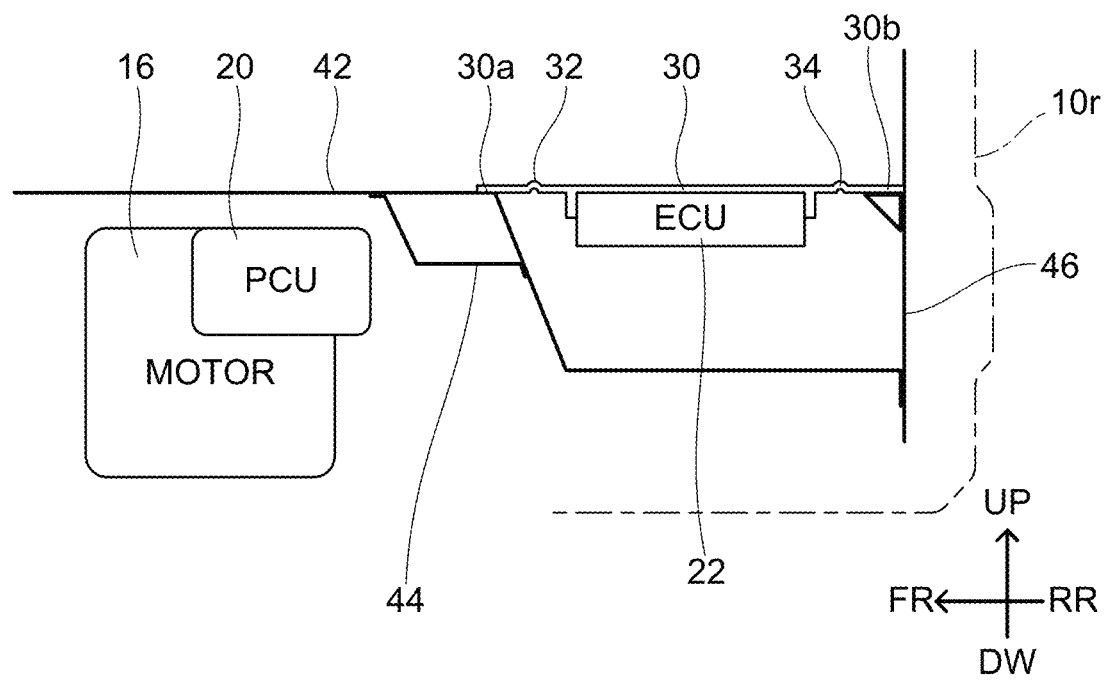
FIG. 3 is a side view schematically showing the configuration of the rear portion 12r of the body 12.

As shown in FIGS. 1 to 3, the electric vehicle 10 further includes a traction motor 16, a battery unit 18, a power control unit 20, and an electronic control unit 22. The traction motor 16 is configured to drive at least one of the plurality of wheels 14f, 14r (such as the pair of rear wheels 14r). The battery unit 18 is connected to the traction motor 16 via the power control unit 20, and is configured to supply electric power to the traction motor 16. The battery unit 18 houses a plurality of secondary battery cells, and is configured to be repeatedly charged by an external power source. The power control unit 20 includes a DC-DC converter and/or inverter, and is configured to adjust the electric power supplied from the battery unit 18 to the traction motor 16. The power control unit 20 is also termed a PCU. The electronic control unit 22 includes a processor, and is configured to supply control instructions to the power control unit 20 in accordance with, for example, driving operations performed by a user. The power control unit 20 is also termed an ECU. The electric vehicle 10 may include another power source such as a fuel cell unit or a solar cell panel in addition to or as an alternative to the battery unit 18.

Here, the traction motor 16, the battery unit 18, and the power control unit 20 are so-called high-voltage components, and are electrical components which operate by an AC voltage exceeding 30 volts or a DC voltage exceeding 60 volts. On the other hand, the electronic control unit 22 is a low-voltage component which does not qualify as such a high-voltage component. It is desirable that the high-voltage components such as the traction motor 16, the battery unit 18, and the power control unit 20 are protected so as not to be damaged when a collision occurs to the electric vehicle 10. As such, the traction motor 16 and the power control unit 20 are arranged in the rear portion 12r of the body 12, however, they are arranged distant from a rear surface 10r, which is the rearmost portion of the electric vehicle 10, so as to avoid damage by a rear-end collision. On the other hand, the electronic control unit 22 being the low-voltage component is arranged rearward of the traction motor 16 and the power control unit 20 in the rear portion 12r of the body 12. Here, a position of the electronic control unit 22 in the right-left direction and the up-down direction at least partially coincides with at least one of the traction motor 16 and the power control unit 20.

The rear portion 12r of the body 12 includes, but not limited to, a pair of rear side members 40, a rear floor panel 42, rear crossmember 44, and a back panel 46. The pair of rear side members 40 each extends in the front-rear direction. The rear floor panel 42 extends between the pair of rear side members 40 and configures a floor in the rear portion 12r of the body 12. The rear crossmember 44 is provided along the rear floor panel 42 and extends in the right-left direction between the pair of rear side members 40. The back panel 46 configures a rear wall in the rear portion 12r of the body 12, and a rear end of the rear floor panel 42 is connected to the back panel 46. The traction motor 16 and the power control unit 20 are located frontward of the rear crossmember 44, and the electronic control unit 22 is located rearward of the rear crossmember 44, although not particularly limited thereto. The rear floor panel 42 is angled downward extending rearward from a position of the rear crossmember 44, and the electronic control unit 22 is located above the rear floor panel 42. On the other hand, the traction motor 16 and the power control unit 20 are located below the rear floor panel 42.

The electric vehicle 10 further includes a bracket 30. The bracket 30 is fixed in the rear portion 12r of the body 12 and supports the electronic control unit 22. The electronic control unit 22 is located below the bracket 30 and is suspended by the bracket 30. The bracket 30 is a plate-shaped member extending in the front-rear direction, and includes a front end 30a and a rear end 30b fixed to the body 12. The front end 30a of the bracket 30 is fixed to the rear crossmember 44 of the body 12 at a position frontward of the electronic control unit 22. The rear end 30b of the bracket 30 is fixed to the back panel 46 of the body 12 at a position rearward of the electronic control unit 22. The bracket 30 in the present embodiment is configured of a single member, however, as another embodiment, the bracket 30 may be configured of a plurality of members.

Figure 4:
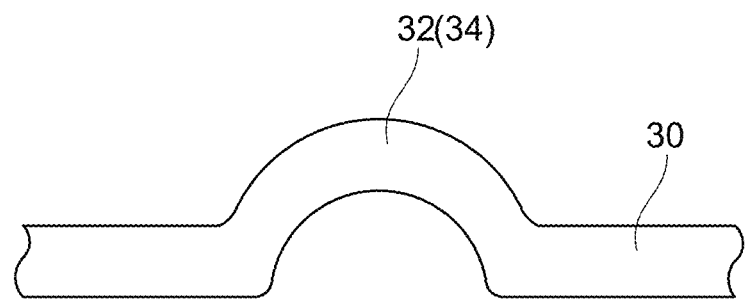
FIG. 4 is a side view showing a first bend 32 (second bend 34) of a bracket 30.

As shown in FIGS. 2 to 4, the bracket 30 further includes a plurality of bends 32, 34. The plurality of bends 32, 34 includes a first bend 32 located frontward of the electronic control unit 22 and a second bend 34 located rearward of the electronic control unit 22. Each of the first bend 32 and the second bend 34 is a bend which has an upwardly protruding shape between the front end 30a and the rear end 30b, and more specifically, it has a bead shape protruding upward. The bead shape herein refers to a shape in which an elongated region extending in one direction is bulged higher than its surrounding. As such, the bracket 30 extends along a straight line linking the front end 30a and the rear end 30b except in areas where the first bend 32 and the second bend 34 are located. That is, the bracket 30 is a member extending straight as a whole and bent locally only at the first bend 32 and/or the second bend 34.

Figure 5:
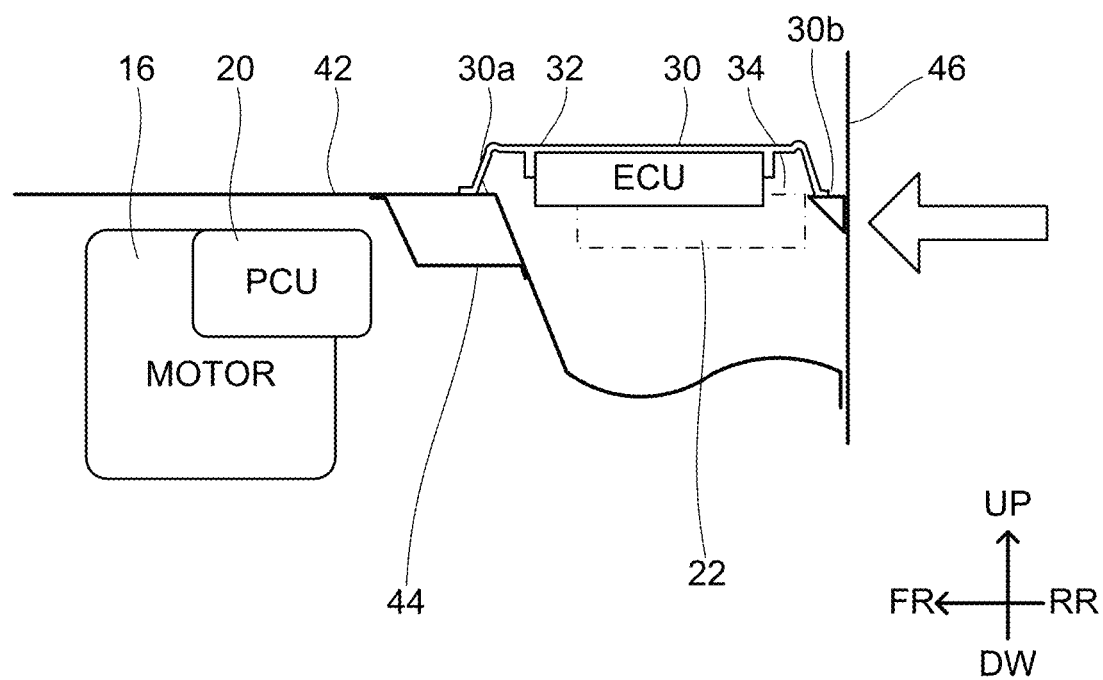
FIG. 5 is a side view schematically showing a behavior of the bracket 30 in a rear-end collision.

As above, in the electric vehicle 10 of the present embodiment, the first bend 32 and the second bend 34 are provided in the bracket 30 supporting the electronic control unit 22. As such, as shown in FIG. 5, when the rear-end collision occurs to the electric vehicle 10, the bracket 30 having received a collision load is prone to collapsing at the first bend 32 and the second bend 34. Especially, since these bends 32, 34 are bends having the upwardly protruding shape, the bracket 30 is prone to collapsing by protruding upward, as a result of which the bracket 30 is displaced upward together with the electronic control unit 22. Due to this, the electronic control unit 22 is prevented from moving frontward, that is, moving toward the high-voltage components such as the traction motor 16 and the power control unit 20.

Especially in the electric vehicle 10 of the present embodiment, the rear crossmember 44 is present between the electronic control unit 22 supported by the bracket 30 and the high-voltage components such as the traction motor 16 and the power control unit 20. Further, the front end 30a of the bracket 30 is fixed to the rear crossmember 44. According to such a configuration, when the bracket 30 further collapses at the first bend 32, the electronic control unit 22 moves toward a position above the rear crossmember 44. This can effectively prevent the electronic control unit 22 from interfering with the high-voltage components such as the traction motor 16 and the power control unit 20 by using the rear crossmember 44.

Here, in the bracket 30 of the present embodiment, each of the first bend 32 and the second bend 34 extends across a full width of the bracket 30. However, as another embodiment, each of the first bend 32 and the second bend 34 may be provided only in a partial area of the bracket 30 in the width direction. Even with such a configuration, the bracket 30 having received the collision load is prone to collapsing at the first bend 32 and the second bend 34.

Figure 6:
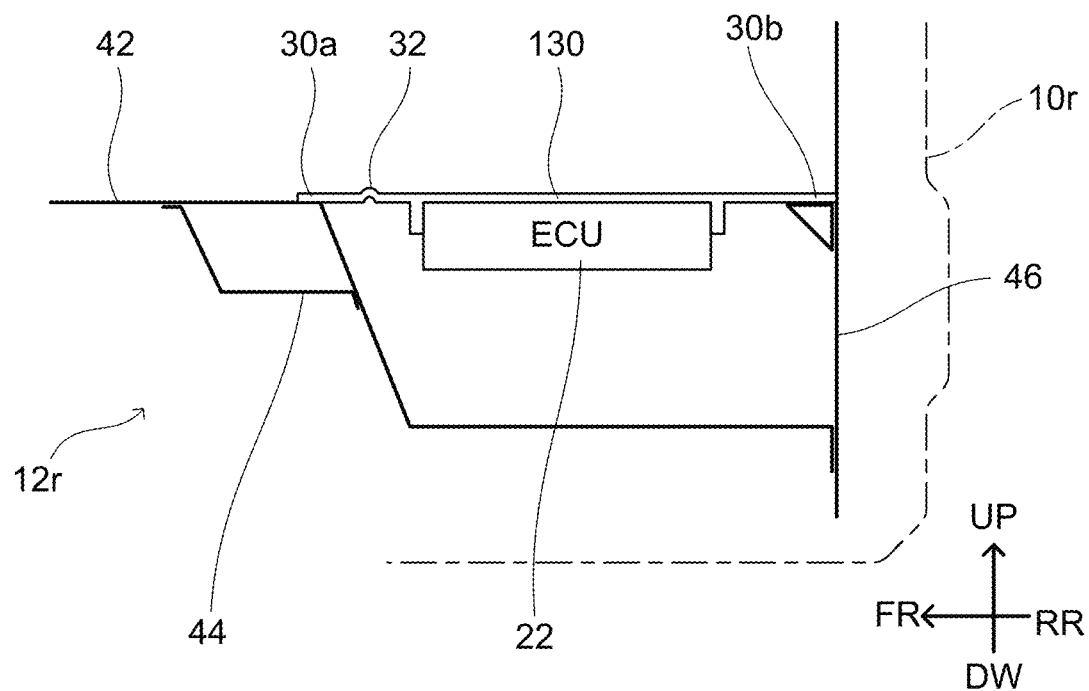
FIG. 6 is a side view showing a bracket 130 of a variant.

FIG. 6 shows a bracket 130 of a variant. This bracket 130 includes only the first bend 32 and does not include the second bend 34. In such a configuration as well, when the rear-end collision occurs to the electric vehicle 10, the bracket 130 having received the collision load is prone to collapsing upward at the first bend 32. Due to this, the bracket 130 is displaced upward together with the electronic control unit 22, which prevents the electronic control unit 22 from moving toward the high-voltage components such as the traction motor 16 and the power control unit 20. Further, as another variant, the bracket 130 may include only the second bend 34 instead of the first bend 32.

Figure 7:
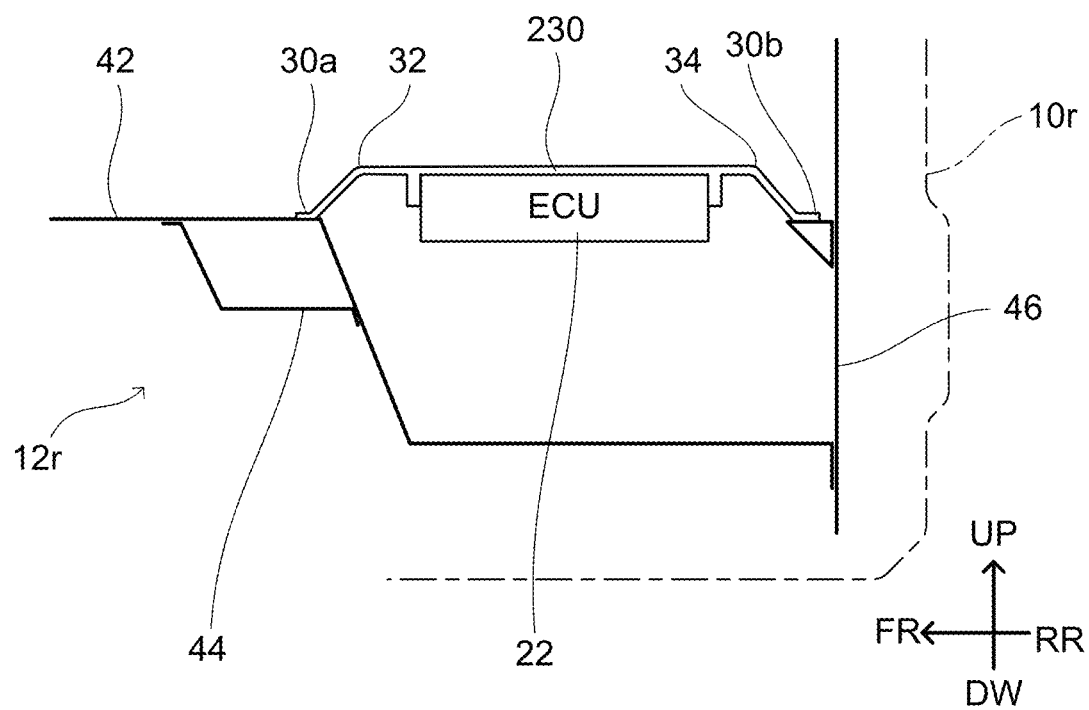
FIG. 7 is a side view showing a bracket 230 of another variant.

FIG. 7 shows a bracket 230 of another variant. In this bracket 230, each of the first bend 32 and the second bend 34 has an upwardly protruding mountain fold shape. As such, each of the first bend 32 and the second bend 34 is located above the straight line linking the front end 30a and the rear end 30b of the bracket 230. With such a configuration as well, when the rear-end collision occurs to the electric vehicle 10, the bracket 230 having received the collision load is prone to collapsing upward at the first bend 32 and the second bend 34. Due to this, the bracket 230 is displaced upward together with the electronic control unit 22, which prevents the electronic control unit 22 from moving toward the high-voltage components such as the traction motor 16 and the power control unit 20.

The electronic control unit 22 in the present embodiments is an example of a low-voltage component supported by the bracket 30, 130, or 230. The brackets 30, 130, 230 of the present embodiments may similarly be employed to various other low-voltage components as well as the electronic control unit 22.

What is claimed is:

1. An electric vehicle comprising:
a body comprising a cabin and a rear potion located rearward of the cabin;
a bracket fixed in the rear potion of the body;
a low-voltage component supported by the bracket; and
a high-voltage component located frontward of the low-voltage component,
wherein
the bracket comprises:
a front end fixed to the body at a position frontward of the low-voltage component;
a rear end fixed to the body at a position rearward of the low-voltage component;
at least one bend located between the front end and the rear end and having an upwardly protruding shape;
an upper surface extending from the front end to the rear end through the at least one bend; and
a lower surface located opposed to the upper surface and extending from the front end to the rear end through the at least one bend,
wherein
the at least one bend comprises a first bend located frontward of the low-voltage component and a second bend located rearward of the low-voltage component,
the upper surface of the bracket comprises a first convex portion at the first bend and a second convex portion at the second bend, and
the lower surface of the bracket comprises a first concave portion at the first bend and a second concave portion at the second bend such that the first concave portion is located opposite to the first convex portion and the second concave portion is located opposite to the second convex portion.

2. The electric vehicle according to claim 1, wherein
the bracket comprises a plate-shaped member extending between the front end and the rear end in a longitudinal direction, and
each of the first bend and the second bend extends across a full width of the bracket perpendicular to the longitudinal direction of the bracket.

3. The electric vehicle according to claim 1, wherein the low-voltage component is located below the bracket.

4. The electric vehicle according to claim 1, wherein one or both of the first bend and the second bend have an upwardly protruding bead shape.

5. The electric vehicle according to claim 4, wherein the bracket extends along a straight line linking the front end and the rear end except in one or more of areas where the at least one bend is located.

6. The electric vehicle according to claim 1, wherein one or both of the first bend and the second bend have an upwardly protruding mountain fold shape.

7. The electric vehicle according to claim 6, wherein one or both of the first bend and the second bend are located above a straight line linking the front end and the rear end of the bracket.

8. The electric vehicle according to claim 1, wherein the low-voltage component is an electronic control unit comprising at least one processor.

9. The electric vehicle according to claim 1, wherein the high-voltage component comprises at least one of a traction motor configured to drive a wheel or a power control unit configured to control electric power supplied to the motor.

10. The electric vehicle according to claim 1, wherein
each of the first convex portion and the second convex portion continuously extends across a full width of the upper surface of the bracket, and
each of the first concave portion and the second concave portion continuously extends across a full width of the lower surface of the bracket.

11. The electric vehicle according to claim 1, wherein
the rear portion of the body comprises:
a pair of rear side members each extends in a front-rear direction;
a rear floor panel extending between the pair of rear side member and configuring a floor in the rear portion of the body;
a rear crossmember provided along the rear floor panel and extending in a right-left direction between the pair of rear side members; and
a back panel configuring a rear wall in the rear portion of the body, a rear end of the rear floor panel being connected to the back panel, and
the front end of the bracket is fixed to the rear crossmember and the rear end of the bracket is fixed to the back panel.

12. The electric vehicle according to claim 11, wherein
the rear floor panel extends downward from the rear crossmember toward the back panel such that a space is defined between the bracket and the rear floor panel in an up-down direction, and
the low-voltage component is located in the space between the bracket and the rear floor panel.

13. The electric vehicle according to claim 1, wherein the lower surface of the bracket is between the low-voltage component and the upper surface of the bracket.

* * * * *